United States Patent
Beeker et al.

(10) Patent No.: US 6,530,044 B1
(45) Date of Patent: *Mar. 4, 2003

(54) SYSTEM AND DISASSEMBLING TEST DATA AND METHOD

(76) Inventors: Scott A. Beeker, 3615 Brisbane St., Colorado Springs, CO (US) 80920; Cornelius J. Falvey, 2251 Beacham Dr., Castle Rock, CO (US) 80104; Mark P. Mullally, 920 Belleview St., La Junta, CO (US) 81050

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/143,956

(22) Filed: Aug. 31, 1998

(51) Int. Cl.[7] ............................................... G06F 11/00
(52) U.S. Cl. ......................................... 714/57; 707/101
(58) Field of Search ........................... 714/57; 707/101, 707/508

(56) References Cited

U.S. PATENT DOCUMENTS

| | | | | |
|---|---|---|---|---|
| 5,566,332 A | * | 10/1996 | Adair | 707/101 |
| 5,689,702 A | * | 11/1997 | Bulusu | 707/100 |
| 5,778,359 A | * | 7/1998 | Stent | 707/4 |
| 5,999,937 A | * | 12/1999 | Ellard | 707/101 |
| 6,016,497 A | * | 1/2000 | Suver | 707/103 |
| 6,032,147 A | * | 2/2000 | Williams | 707/101 |
| 6,102,969 A | * | 8/2000 | Christianson | 717/8 |

OTHER PUBLICATIONS

RT smart Sockets C++ Class Library Manual, Version 3.5, Talarian, 444 Castro Street, Suite 140, Mountain View. CA 94041.
RT smart Sockets Read Me First, Installation, Release Notes, Known Bugs, Demos, Version 3.5,Talarian, 444 Castro Street, Suite 140, Mountain View, CA 94041.
RT smart Sockets API Quick Reference, Version 3.5, Talarian, 444 Castro Street, Suite 140, Mountain View, CA 94041.
RT smart Sockets Manual, Reliable Interprocess Communication, Version 3.5, Talarian, 444 Castro Street, Suite 140, Mountain View, CA 94041.
RT smart Sockets API, Reliable Interprocess Communication. Version 3.5, Talarian, 444 Castro Street, Suite 140, Mountain View, CA 94041.
RT works Utilities Manual, License Manager, Utilities, Macros, RT works 3.5, Talarian, 444 Castro Street, Suite 140, Mountain View, CA 94041.

* cited by examiner

Primary Examiner—Robert Beausoleil
Assistant Examiner—Bryce Bonzo (57) ABSTRACT

A system (50) for disassembling test data includes a data structure definition system (54) and a machine readable file (52). A disassembly system (56) determines a first field from the data structure definition system (54) and converts a first portion of the machine readable file (52) to a human readable format (58) according to a definition of the first field in the data structure definition system (54).

10 Claims, 8 Drawing Sheets

BEGIN_OBJECT NAME TestBlock
126     ! following field holds number of bytes the "Name" field occupies
    FIELD NAME NameSize DATATYPE INT SIZE 4
128     ! following field holds variable length block name string
    FIELD NAME Name DATATYPE STRING SIZE VARIABLE
    ! following field holds the type of messages the block contains
136     ! A = MsgA, B = MsgB, C = MsgC
    FIELD NAME MsgType DATATYPE STRING SIZE 1
140     ! following field holds number of messages contained in block
    FIELD NAME NumMsgs DATATYPE UINT SIZE 4
    ! following list provides the means for the block to contain
144     ! 0, 1, or many messages
    BEGIN_LIST OR NAME MsgList
148     INCLUDE NAME MsgA
150     INCLUDE NAME MsgB
152     INCLUDE NAME MsgC
    END_LIST
166     ! following field allows block of messages to be padded
    FIELD NAME Padding SPECIAL PADDED
END_OBJECT

```
    BEGIN_MESSAGE NAME TestBlock
132    TestBlock.NameSize  = 17
134    TestBlock.Name      = "Dale's Test Block"
138    TestBlock.MsgType   = B
142    TestBlock.NumMsgs   = 3
            ! Three instances of "MsgB"...agrees with value of predecessor
160    BEGIN_MESSAGE MsgB
            ! Field/Value pairs
            ...
            ...
            ...
        END_MESSAGE
162    BEGIN_MESSAGE MsgB
            ! Field/Value pairs
            ...
            ...
            ...
        END_MESSAGE
164    BEGIN_MESSAGE MsgB
            ! Field/Value pairs
            ...
            ...
            ...
        END_MESSAGE
        TestBlock.Padding = 2000
    END_MESSAGE
```

146 — TestBlock.BlockName:     130 [size] = TestBlock.BlockNameSize 154 — TestBlock.BlockMsgList:     [count] = TestBlock.NumMsgs 156 — MsgA:     [isobject] TestBlock.MsgType = A 158 — MsgB:     [isobject] TestBlock.MsgType = B 168 — MsgC:     [isobject] TestBlock.MsgType = C TestBlock.Padding:     [size] = [remainder]

FIG. 7

LOGIC TREE ENTRIES:

*Dependency Expressions*
Logical expression using the operators "AND", "OR", and "NOT" are allowed as well as simple mathematical statements. Parentheses can be used to establish explicit evaluation order.
Examples:
- (MPMRecordID = 3 AND NOT MPMSubRecordID = 4) OR (MPMRecordID = 7 AND MPMSubRecordID = 6)
- ((SABTotalLength + SABPadding) - SABHeader) / SABNumRecords

*Commands*

SIZE
Syntax: <Target Object Name>: *size* = <Dependency Expression>
Example: SABSubObject: [size] = SABObject.SubPortionLength / SABObject.NumSubRecords COUNT
Syntax: <Target Object Name>: *count* = <Dependency Expression>
Example: SABOrList: [count] = SABObject.NumRecords ISOBJECT
Syntax: <Target Object Name>: *isobject* <Dependency Expression>
Example: FirstOrListElement: [isobject] SABObject.RecordType = 'D' AND SABObject.SpecialData = 'NO'

FIG. 8

SYSTEM AND DISASSEMBLING TEST DATA AND METHOD

RELATED APPLICATIONS

The present application is related to patent application Ser. No. 09/110,547 filed Jul. 6, 1998, now U.S. Pat. No. 6,219,802, patent application Ser. No. 09/143,957, filed Aug. 31, 1998, now abandoned, and patent application Ser. No. 09/143,958, filed Aug. 31, 1998, now U.S. Pat. No. 6,321,347, assigned to the same assignee as the present application and having the same inventors as the present application.

FIELD OF THE INVENTION

The present invention relates generally to the field of networks and more particularly to a system and method for disassembling test data.

BACKGROUND OF THE INVENTION

Figure 1:
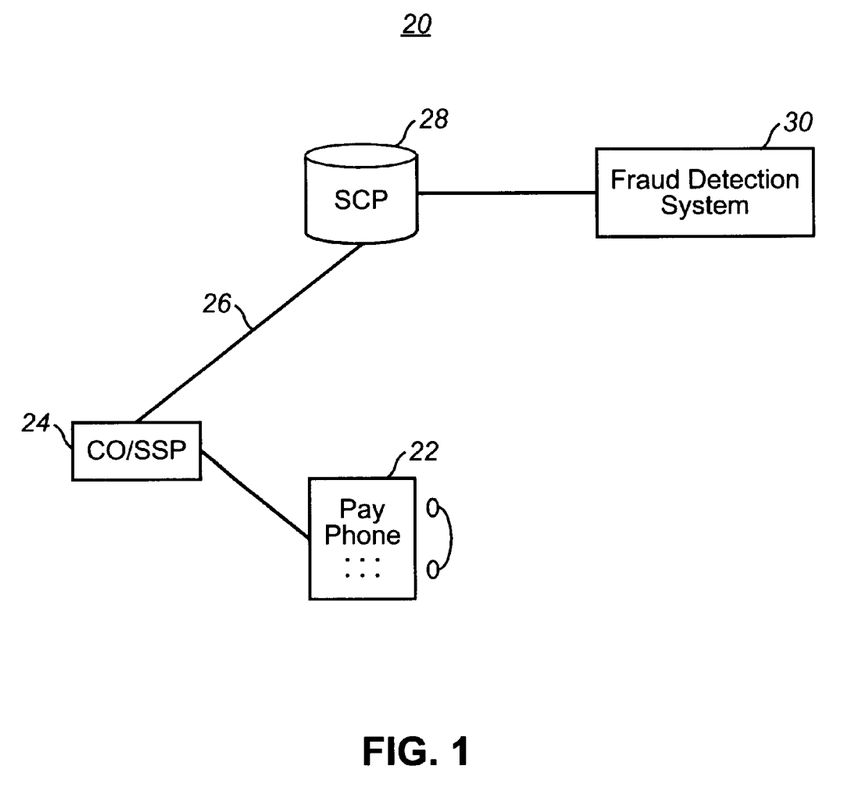
FIG. 1 is a block diagram of a portion of a telephone system.

Computer systems running complex interrelated software modules require testing as new revisions of the software modules are introduced and as problems or "bugs" are discovered in existing software modules. An example of such a computer system is shown in FIG. 1. This example shows a small part of a telephone network 20. In this figure, a public telephone 22 is connected to a central office—service switching point (CO/SSP) 24. The CO/SSP 24, as part of its call processing, sends a call record over a signaling network 26 to a service control point (SCP) 28. The SCP 28 passes the call records on to a fraud detection system 30. When a new version of the fraud detection system 30 has been developed, it is necessary to test the new version of the fraud detection system 30 before adding it to the telephone network. This requires simulating the flow of call records that the new version of the fraud detection system has been designed to analyze. Ideally, this simulation data would be generated by the actual network elements in a laboratory setting. Often, this is not practical due to a number of reasons, including, limited funds, limited laboratory resources, staggered development cycles of dependent network elements, etc.

Testing commonly requires determining if an expected result has been returned by the component under test. Many network components communicate in formats that are not human readable. Comparing an expected result with a received result can be very time consuming and expensive when the results (files) are in a machine readable format. In addition, it is easy to miss errors. Finally data formats change often in the fast paced computer networks area and these changes obsolete data format specific test tools.

Thus there exists a need for a system and method for disassembling test data that is inexpensive, easy to use and can disassemble a variety of data formats.

SUMMARY OF THE INVENTION

A system for disassembling test data that overcomes these and other problems includes a data structure definition system and a machine readable file. A disassembly system determines a first field from the data structure definition system and converts a first portion of the machine readable file to a human readable format according to a definition of the first field in the data structure definition system.

The system disassembles specified test data using the data structure definition system. The versatility of the data structure definition system allows the system to disassemble any data format with minimal effort on the part of the user. As a result when data formats change, the system can be quickly adapted to disassemble the new data format. This makes the system easy and inexpensive to use.

The present invention is applicable to any industry that develops inter-related software modules, including: communication companies, business and operating software companies, networking companies, defense companies, semiconductor companies, etc. Programmers need to test how their programs will work with other programs before releasing their software. This often requires disassembling files and data into a human readable format. The present invention allows a user to review files in a format that they can easily understand. This greatly simplifies the effort required by programmers to test their programs.

DETAILED DESCRIPTION OF THE DRAWINGS

The invention is used in testing software modules. Particularly software modules used in networks. In order to test a software module, the programmer has to create test data. Then the programmer has to create a module to simulate the communication interface between the software module under test and the other software modules in the network. Finally, the programmer has to disassemble files and data into a human readable format to determine if any errors have occurred. The invention is designed to provide a tool that can be easily tailored to disassemble any data format.

Figure 2:
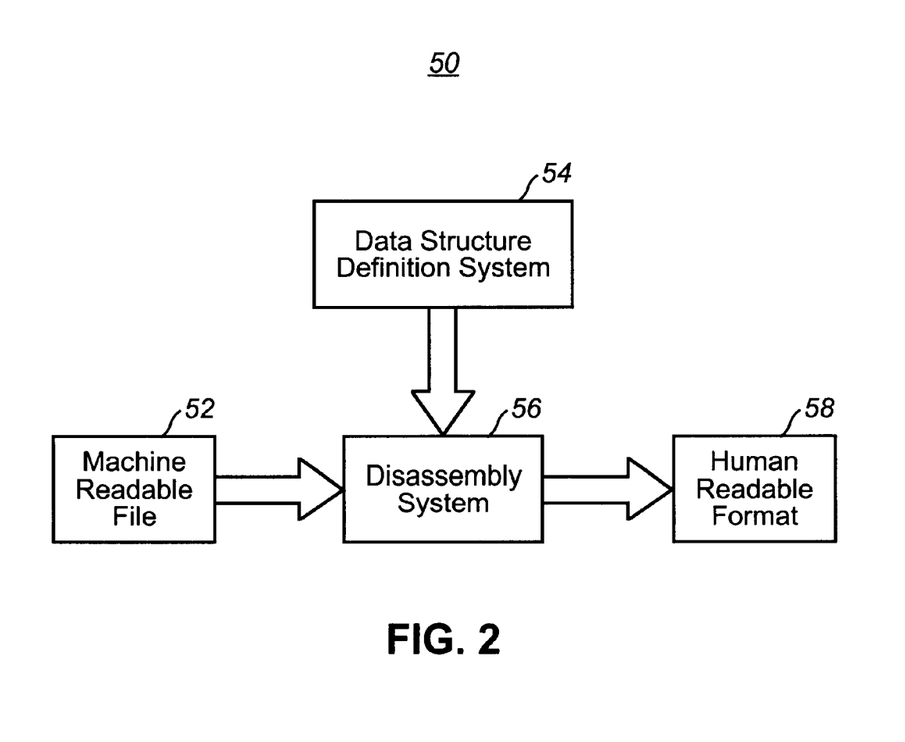
FIG. 2 is a block diagram of a system for disassembling test data in accordance with one embodiment of the invention.

FIG. 2 is a block diagram of a system 50 for disassembling test data in accordance with one embodiment of the invention. The system has a machine readable file 52 that is to be disassembled. A data structure definition system 54 is a blueprint of how the data in the machine readable file is organized. The disassembly system 56 determines a first field from the data structure definition system 54. The disassembly system 56 converts a first portion of the machine readable file 52 to a human readable format 58 using the first field in the data structure definition system 54. In one embodiment, the data structure definition system 54 includes an indefinite field. A logic tree definition system is used by the disassembly system 56 to determine a structure of the indefinite field. The logic tree definition system has a number of commands to resolve indefinite fields. A size command is used to resolve the size of a field having an indefinite size (indefinite length). A count command and an isobject command are used to resolve an OR list logical grouping. An OR list logical grouping has a number of elements ORed together. As a result it is indefinite as to the number of elements in the OR list logical grouping. The count command determines the number of elements in the OR list logical grouping. The isobject command is used to determine if the first and subsequent elements are element A or element B (a predetermined type of element). Once the number of elements are known and the type of each element, the OR list can be disassembled. A third indefinite field is a padding field. The size command may be used in combination with a remainder dependency to determine the size of the padding.

In one embodiment the machine readable format is a binary format and the human readable format is an ASCII format.

Figure 3:
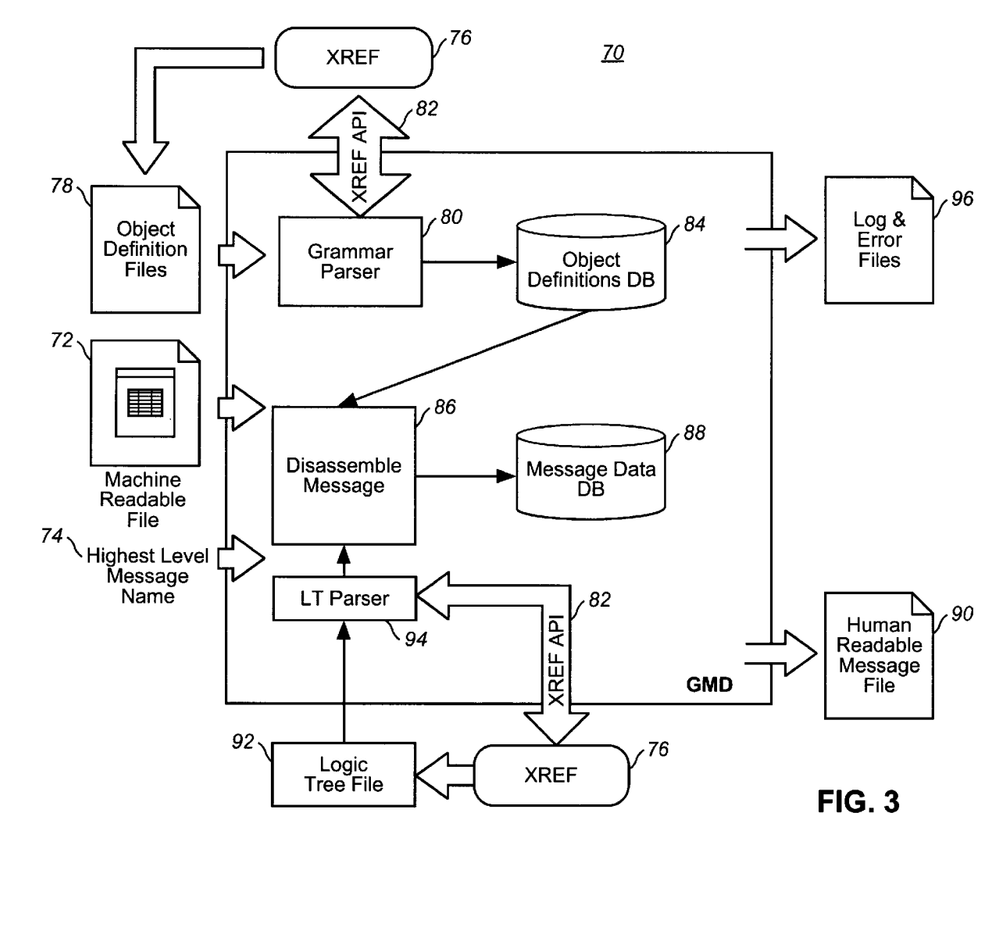
FIG. 3 is a schematic diagram of a system for disassembling test data in accordance with one embodiment of the invention.

FIG. 3 is a schematic diagram of a system 70 for disassembling test data in accordance with one embodiment of the invention. The user specifies a machine readable file 72 to be disassembled and a highest level message 74. The XREF routine (index, reference) 76 uses the highest level message name to find the object's tree definition file 78. The grammar parser 80 communicates with the XREF 76 through an XREF application program interface (API) 82. The grammar parser then accesses the object definition files 78 to build object definitions that are stored in an object definition database 84. A disassemble message routine 86 uses the object definitions to convert the machine readable file into a human readable format that is stored in the message data database 88 and output to a human readable message file (output file) 90. If an indefinite field is encountered, the XREF routine 76 is invoked to determine the appropriate logic tree file 92 to resolve the indefinite behavior. A logic tree parser 94 selects the appropriate command to resolve the indefiniteness. Informational messages and error messages created by the grammar parser and the disassemble message routine are stored in a log file 96 and an error file 96 respectively. In one embodiment, the GMD (generic message disassembler) uses the UNIX lexical analyzer (LEX) and Yet Another Compiler Compiler (YACC) to process the files. The system 70 can be implemented on any general purpose computer using a programming language and execution system for this purpose or can be built using discrete components.

Figure 4:
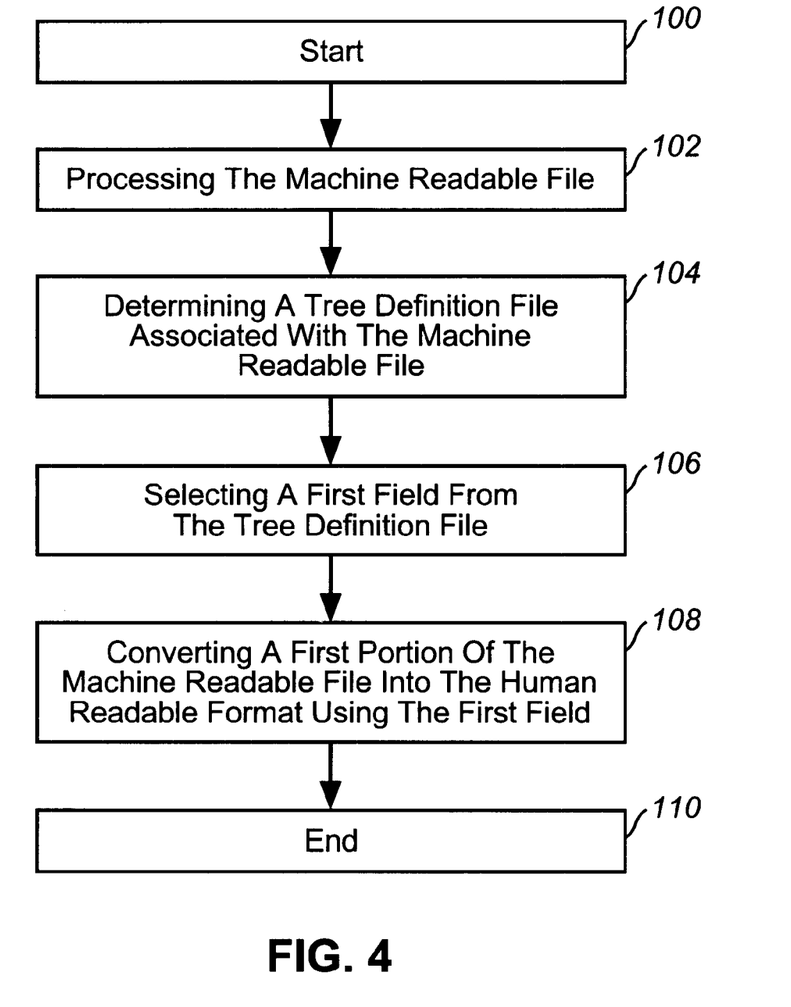
FIG. 4 is a flow chart of the steps used in operating a system for disassembling test data in accordance with one embodiment of the invention.

FIG. 4 is a flow cart of the steps used in operating a system for disassembling test data in accordance with one embodiment of the invention. The process starts, step 100, by processing the machine readable file at step 102. A tree definition file associated with the machine readable file is determined at step 104. A first field is selected from the tree definition file at step 106. At step 108, a first portion of the machine readable file is converted into the human readable format using the first field which ends the process at step 110. In one embodiment, the step of determining the tree definition file includes the step of creating the tree logic file based on the tree definition file. The tree logic file is created by selecting a first indefinite field and determining an appropriate command to determine the indefiniteness. When the indefinite field is encountered at the step of converting the machine readable file into a human readable format, a command is selected from the tree logic file. The command is executed to determine a parameter. The portion of the machine readable file associated with the indefinite field is converted to the human readable format using the parameter and the indefinite field, and stored in an output file.

The tree logic file has a number of commands to determine an indefiniteness. For instance, a size command can to determine the length of a field that is indefinite. A count command and an isobject command are used to resolve an OR list logical grouping. An OR list logical grouping has a number of elements ORed together. As a result it is indefinite as to the number of elements in the OR list logical grouping. The count command determines the number of elements in the OR list logical grouping. The isobject command is used to determine if the first and subsequent elements are element A or element B (a predetermined type of element). Once the number of elements are known and the type of each element, the OR list can be disassembled. A third indefinite field is a padding field. The size command is used to determine the size of the padding.

Figure 5:
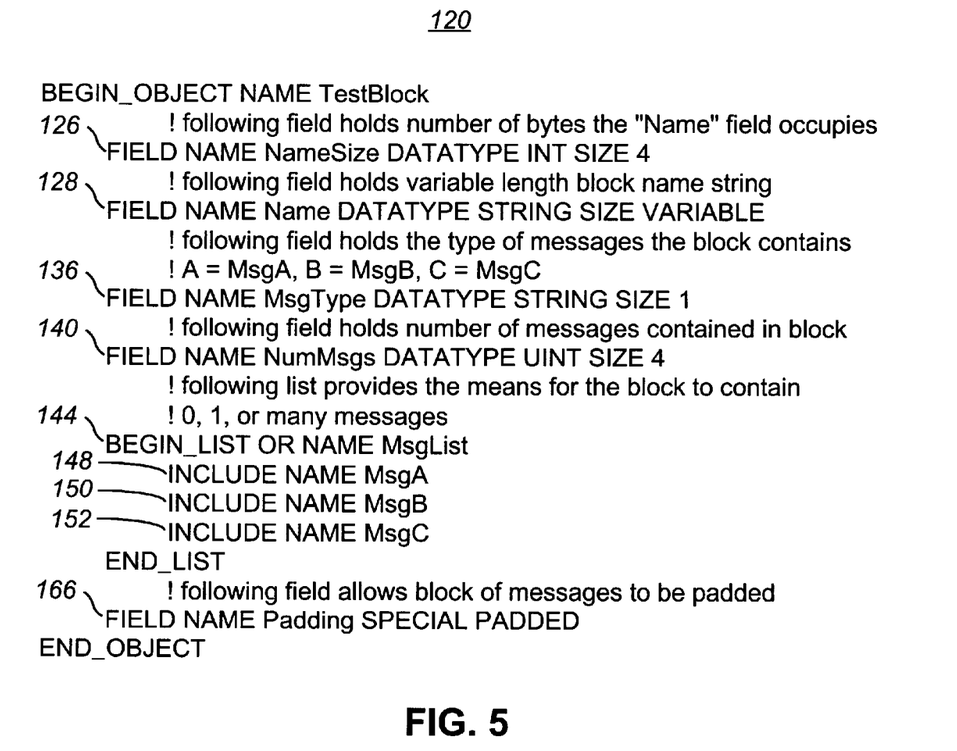
FIG. 5 is an example of a tree definition file in accordance with one embodiment of the invention.
Figure 6:
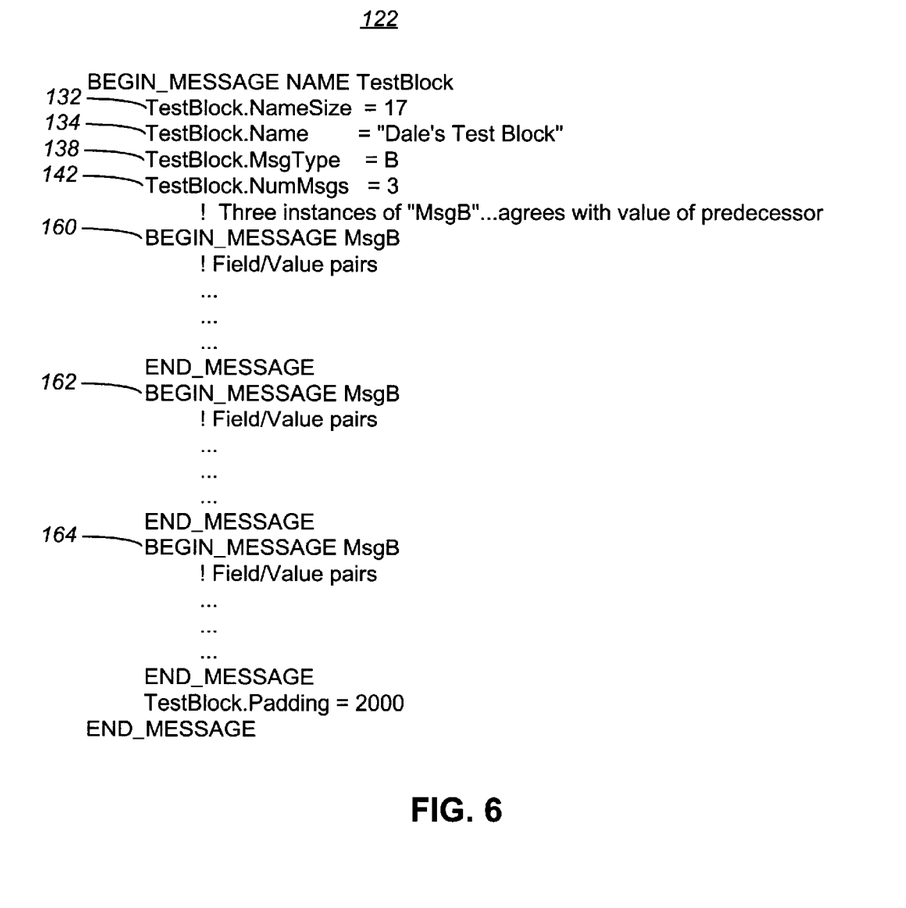
FIG. 6 is an example of a message instance file in accordance with one embodiment of the invention.
Figure 7:
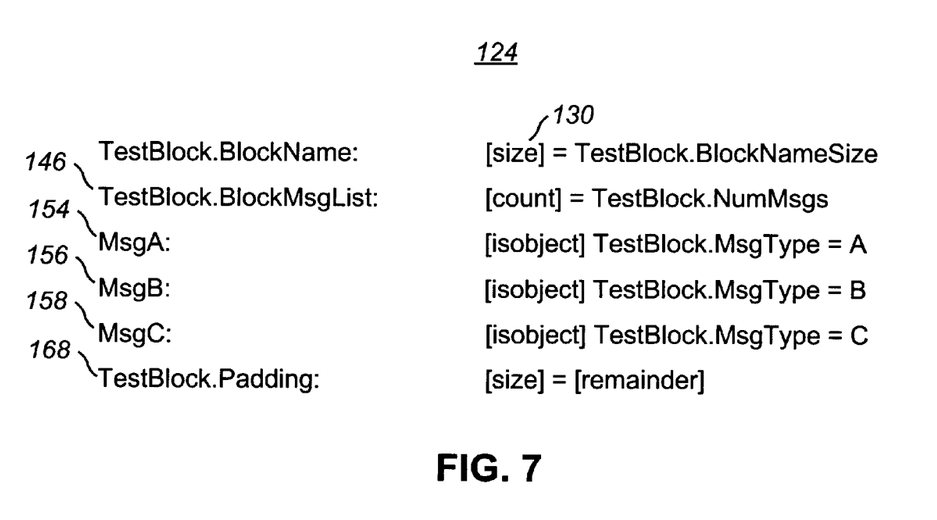
FIG. 7 is an example of a tree logic file in accordance with one embodiment of the invention.
Figure 8:
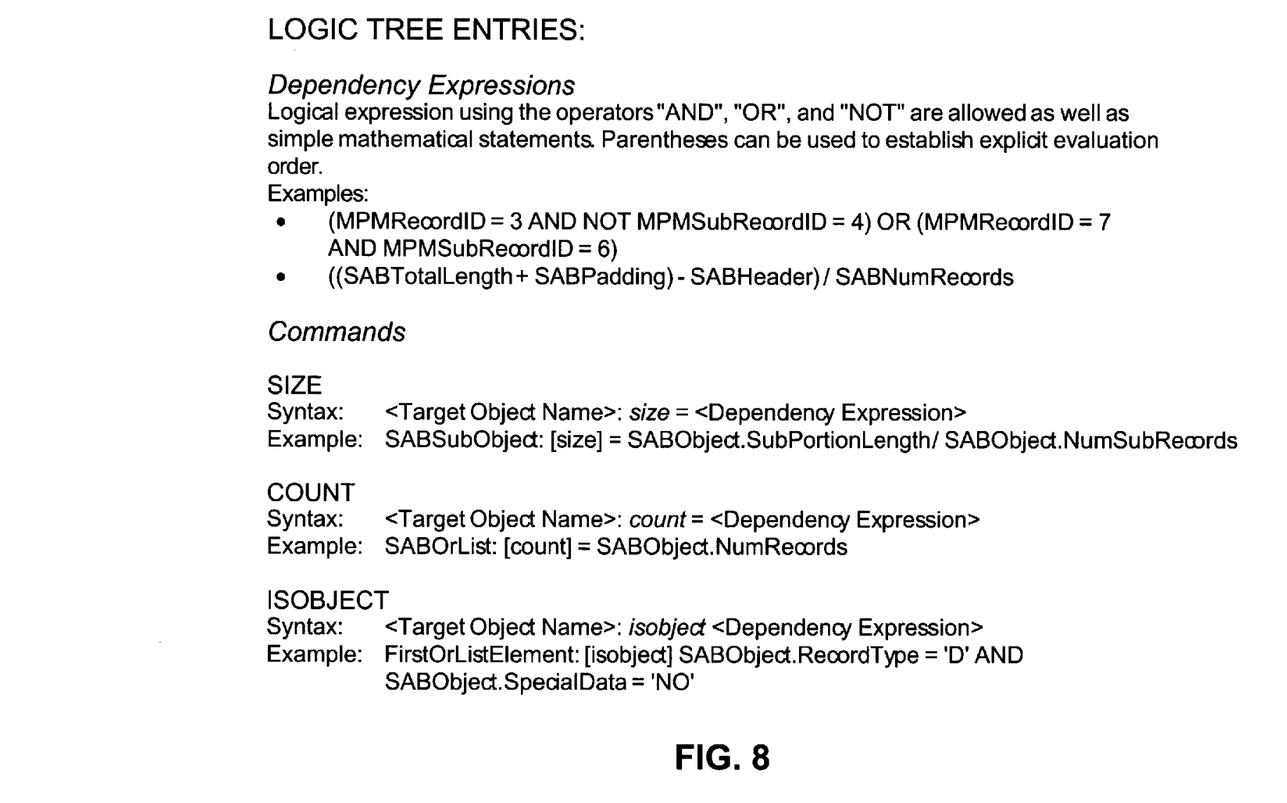
FIG. 8 is a list of commands used in a tree logic programming language.

An example of how a tree logic file is created and used in disassembling a file is explained using FIGS. 5, 6 & 7. FIG. 5 is an example of a tree definition file 120 in accordance with one embodiment of the invention. FIG. 6 is an example of a message instance file 122 in accordance with one embodiment of the invention. A message instance file 122 includes user specific data. FIG. 7 is an example of a tree logic file 124 in accordance with one embodiment of the invention. Note that a message instance file 122 would not be used in creating the tree logic file 124 or disassembling a machine readable file, however, the message instance file 122 would be the output and helps explain the process. The first step is to find the first field 126 in the tree definition file 120. The first field is "NameSize." This field is definite so it can be disassembled without the tree logic file 124. The second field 128 is "name" and it is an indefinite field, since the size is variable. Since the field size is indefinite, a size command is needed in the tree logic file 124 (FIG. 7). The first entry in the tree logic file 124 is a size command 130. The size command shows that the size value is held in "TestBlock.BlockNameSize." In a real application the field "TestBlock.BlockNameSize" would already have been disassembled from the machine readable file. For our purposes we will look at the message instance file (FIG. 6) 122. There we see that the "TestBlock.BlockNameSize" 132 is 17, which means it is 17 bytes long. With this information the next 17 bytes from the machine readable file are converted to "Dale's Test Block", see "TestBlock.Name" 134 in the message instance file 122 (FIG. 6). The next field "MsgType" 136 is definite so it does not require the tree logic file 124. From the message instance file 122 we see that "MsgType" is B 138. The next field is "NumMsgs" 140. This field is not indefinite and the value 142 is 3, which can also be found in the message instance file 122. The next entry in the tree definition file is an OR list named "MsgList" 144. This is an indefinite entry (field) so a count command 146 from the tree logic file 124 is used to determine the number of messages. The count command states that the number of messages is stored in "NumMsgs" 138 which has been disassembled and is 3. Three message types are operatively associated with the OR list. The three message types are "MsgA" 148, "MsgB" 150 and "MsgC" 152. The tree logic file 124 has an isobject command for MsgA 154, an isobject command for MsgB 156 and an isobject command for MsgC 158. The isobject command determines the type of message by looking at the "MsgType." This information is shown in the message instance file 122, in the BEGIN_MESSAGE line 160, 162, 164. With this information the machine readable file can be disassembled. The final field 166 in the tree definition file 120 is a padding field. The padding field fills the remainder of the message with filler bytes. The padding field is an indefinite size. The tree logic file 124 uses a size command 168 and the dependency "remainder" to determine the size of the padding. This ends the tree definition file. FIG. 8 is a list of commands (plurality of logic commands) used in a tree logic programming language.

Using the system and method of the present invention a user can quickly and efficiently disassemble any data file. This makes it easier to compare derived files with expected files and easier to spot errors.

The methods described herein can be implemented as computer-readable instructions stored on a computer-readable storage medium that when executed by a computer will perform the methods described herein.

While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A method for disassembling test data into a format easily understandable by a human, comprising the steps of:
    accessing the test data in a machine readable file, said test data containing a message that has an indefinite field;
    detecting the indefinite field in the message based on a definition file, said definition file specifying an organization of the message and the indefinite field;
    resolving the indefinite field based on a logic file, said logic file including a command for resolving the indefinite field, by executing the command for resolving the indefinite field; and
    outputting a file based on the resolved indefinite field, said file being in a format that is easily understandable by a human.

2. A method according to claim 1, wherein the definition file specifies that the indefinite field has a variable size and the command includes a size command that determines the size of the indefinite field.

3. A method according to claim 1, wherein the definition file specifies that the indefinite field has an OR list logical grouping of a number of elements and the command includes a count command that determines the number of elements in the OR list logical grouping.

4. A method according to claim 1, wherein the definition file specifies that the indefinite field is a padding field and the command includes a size command with a remainder dependency for determining the size of the padding field.

5. A method according to claim 1, wherein the format that is easily understandable by a human is an ASCII format.

6. A computer system for disassembling test data into a format easily understandable by a human, said test data containing a message that has an indefinite field, comprising:
    a definition file specifying an organization of the message and the indefinite field;
    a logic file including a command for resolving the indefinite field; and
    a disassembler configured for:
        detecting the indefinite field in the test data based on the definition file,
        resolving the indefinite field by executing the command for resolving the indefinite field, and
        outputting a file based on the resolved indefinite field, said file being in a format that is easily understandable by a human.

7. A computer system according to claim 6, wherein the definition file specifies that the indefinite field has a variable size and the command includes a size command that determines the size of the indefinite field.

8. A computer system according to claim 6, wherein the definition file specifies that the indefinite field has an OR list logical grouping of a number of elements and the command includes a count command that determines the number of elements in the OR list logical grouping.

9. A computer system according to claim 6, wherein the definition file specifies that the indefinite field is a padding field and the command includes a size command with a remainder dependency for determining the size of the padding field.

10. A computer system according to claim 6, wherein the format that is easily understandable by a human is an ASCII format.

* * * * *